United States Patent
Suzuki

(10) Patent No.: US 11,933,705 B2
(45) Date of Patent: Mar. 19, 2024

(54) FLUID HANDLING DEVICE, DISPERSION LIQUID PRODUCTION SET, AND METHOD FOR PRODUCING DISPERSION LIQUID

(71) Applicant: Enplas Corporation, Kawaguchi (JP)

(72) Inventor: Seiichiro Suzuki, Saitama (JP)

(73) Assignee: Enplas Corporation, Kawaguchi (JP)

( * ) Notice: Subject to any disclaimer, the term of this patent is extended or adjusted under 35 U.S.C. 154(b) by 541 days.

(21) Appl. No.: 17/190,466

(22) Filed: Mar. 3, 2021

(65) Prior Publication Data
US 2021/0278324 A1 Sep. 9, 2021

(30) Foreign Application Priority Data
Mar. 6, 2020 (JP) ................... 2020-038741

(51) Int. Cl.
*G01N 1/38* (2006.01)
*B01L 3/02* (2006.01)

(52) U.S. Cl.
CPC .............. *G01N 1/38* (2013.01); *B01L 3/0241* (2013.01); *B01L 2400/0493* (2013.01)

(58) Field of Classification Search
CPC ................................ G01N 1/38; B01L 3/0241
See application file for complete search history.

(56) References Cited

U.S. PATENT DOCUMENTS
2004/0068019 A1 4/2004 Higuchi et al.

FOREIGN PATENT DOCUMENTS
JP 2011185839 A * 9/2011
WO 02/068104 9/2002

* cited by examiner

*Primary Examiner* — Robert A Hopkins
(74) *Attorney, Agent, or Firm* — Amin, Turocy & Watson, LLP

(57) ABSTRACT

An objective is to provide a fluid handling device capable of reliably generating a dispersion liquid in which a liquid droplet containing a sample is dispersed in a dispersion medium. The fluid handling device achieving the objective includes: a sample channel; a dispersion medium channel; a dispersion liquid generation part connected to the sample channel and the dispersion medium channel, and configured to divide the sample by the dispersion medium to generate a dispersion liquid in which a liquid droplet of the sample is dispersed in the dispersion medium; and a dispersion liquid channel connected to the dispersion liquid generation part, in which $Y \leq 0.0436X - 1.2563$ is satisfied, where X denotes a contact angle [°] between a portion of an inner wall of the dispersion liquid channel and water, and Y denotes a viscosity [mPa·s] of the sample measured at 25° C. by a falling-ball viscometer.

6 Claims, 5 Drawing Sheets

FLUID HANDLING DEVICE, DISPERSION LIQUID PRODUCTION SET, AND METHOD FOR PRODUCING DISPERSION LIQUID

CROSS REFERENCE TO RELATED APPLICATIONS

This application is entitled to and claims the benefit of Japanese Patent Application No. 2020-038741, filed on Mar. 6, 2020, the disclosure of which including the specification, drawings and abstract is incorporated herein by reference in its entirety.

TECHNICAL FIELD

The present invention relates to a fluid handling device, a dispersion liquid production set, and a method for producing a dispersion liquid.

BACKGROUND ART

Clinical tests, food tests, environmental tests, and the like may require high-precision analysis of minute amounts of analytes such as cells, proteins, nucleic acids, and the like. One of the methods for analyzing the minute amounts of analytes is to generate liquid droplets of 0.1 to 1000 μm in diameter from a liquid containing an analyte, and observe and analyze the liquid droplets.

Various methods have been proposed as a technique for preparing the liquid droplets. For example, Patent Literature (hereinafter, referred to as "PTL") 1 describes a method in which a sample or the like is introduced, from a second channel connected to a first channel, into a continuous phase (dispersion medium) flowing through the first channel in a microchannel, and the sample is divided into liquid droplets by a shearing force of the continuous phase.

CITATION LIST

Patent Literature

PTL 1
WO2002/068104

SUMMARY OF INVENTION

Technical Problem

However, in the method as described in PTL 1, when the affinity between the material forming the channels and the sample is high, the divided liquid droplets (sample) may adhere to the wall surface of the channels. When such liquid droplets adhere to the wall surface of the channel, liquid droplets generated later are coupled to the liquid droplets generated earlier, and the liquid droplets adhered to the wall surface of the channel are gradually enlarged. Then, the liquid droplets are coupled in succession, so that the sample becomes a laminar flow and moves in the channels. That is, the sample cannot be divided appropriately, and it becomes difficult to generate a dispersion liquid. In addition, particularly when the viscosity of the sample is high, such a phenomenon is likely to occur.

The present invention has been made in view of the above problem. Specifically, the present invention aims to provide a fluid handling device capable of reliably generating a dispersion liquid in which a liquid droplet containing a sample is dispersed in a dispersion medium, a dispersion liquid production set including the fluid handling device, and a method for producing a dispersion liquid.

Solution to Problem

In order to solve the above problem, the present invention provides the following fluid handling device.

A fluid handling device, including: a sample channel for allowing a sample to flow therethrough; a dispersion medium channel for allowing a dispersion medium to flow therethrough; a dispersion liquid generation part connected to the sample channel and the dispersion medium channel, and configured to divide the sample by the dispersion medium to generate a dispersion liquid in which a liquid droplet of the sample is dispersed in the dispersion medium; and a dispersion liquid channel connected to the dispersion liquid generation part, and configured to allow the dispersion liquid to flow therethrough, in which $Y \leq 0.0436X - 1.2563$ is satisfied, where X denotes a contact angle [°] between a portion of an inner wall of the dispersion liquid channel and water, and Y denotes a viscosity [mPa·s] of the sample measured at 25° C. by a falling-ball viscometer.

The present invention provides the following dispersion liquid production set.

A dispersion liquid production set, including: a fluid handling device; a sample that is to be caused to flow through the fluid handling device, and contains a polar solvent; and a dispersion medium that is to be caused to flow through the fluid handling device, and contains a non-polar solvent.

The present invention provides the following method for producing a dispersion liquid.

A method for producing a dispersion liquid, including: causing, to flow through the sample channel of the above fluid handling device, a sample containing a polar solvent and having a viscosity of 1.5 to 3.5 mPa·s measured at 25° C. by a falling-ball viscometer; and causing a dispersion medium containing a non-polar solvent to flow through the dispersion medium channel of the fluid handling device substantially at the same time as causing the sample to flow.

Advantageous Effects of Invention

According to the fluid handling device according to the present invention, the dispersion liquid production set including the fluid handling device, and further, the method for producing the dispersion liquid using the fluid handling device, it is possible to reliably generate a dispersion liquid in which a liquid droplet containing a sample is dispersed in a dispersion medium.

DESCRIPTION OF EMBODIMENTS

Hereinafter, a fluid handling device, a dispersion liquid production set including the same, and a method for producing a dispersion liquid using the fluid handling device will be described in detail based on a specific embodiment. However, the fluid handling device, the dispersion liquid production set, and the method for producing the dispersion liquid are not limited to the following embodiment.

Figure 1:
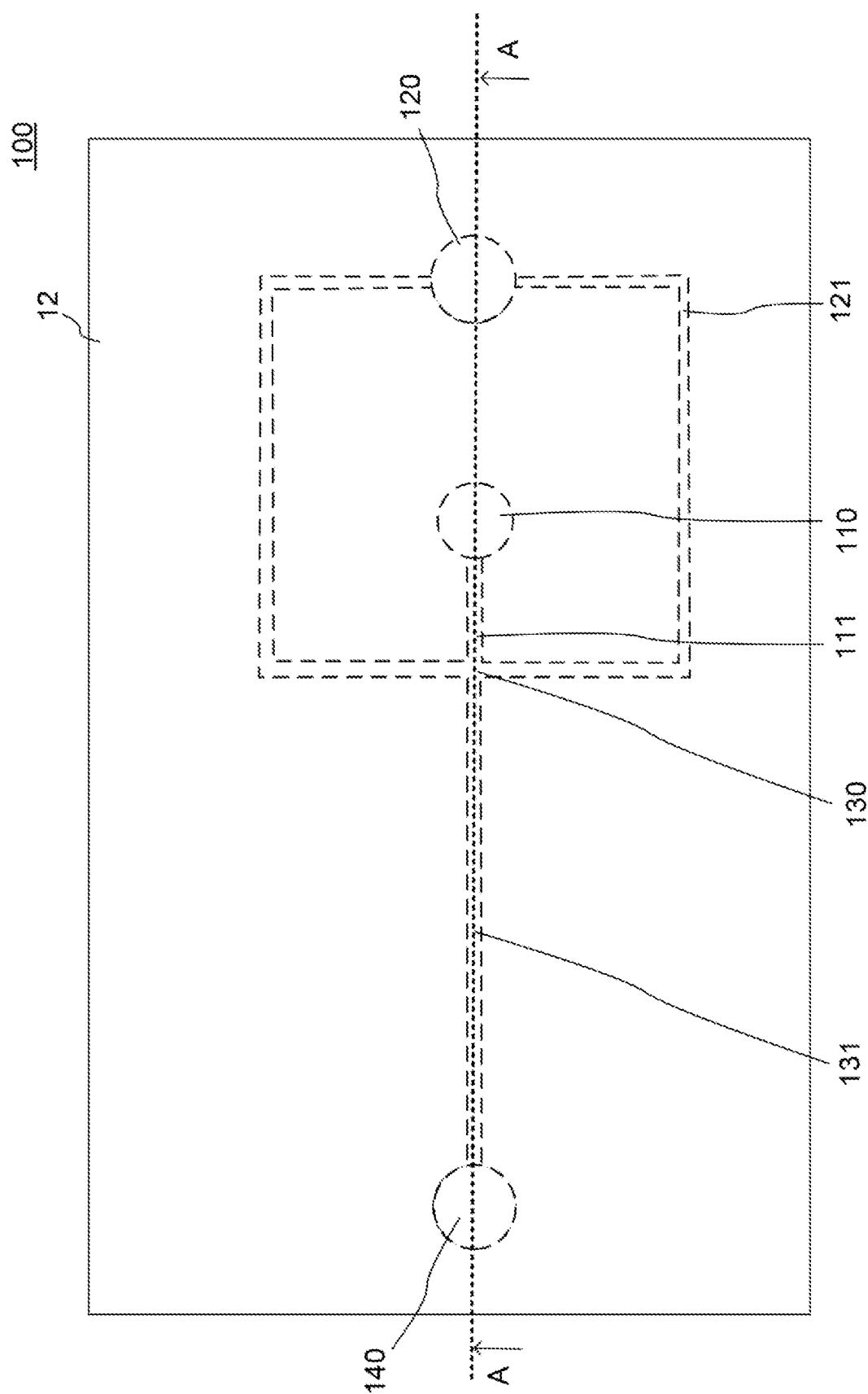
FIG. 1 is a plan view of a fluid handling device according to an embodiment of the present invention.
Figure 2:
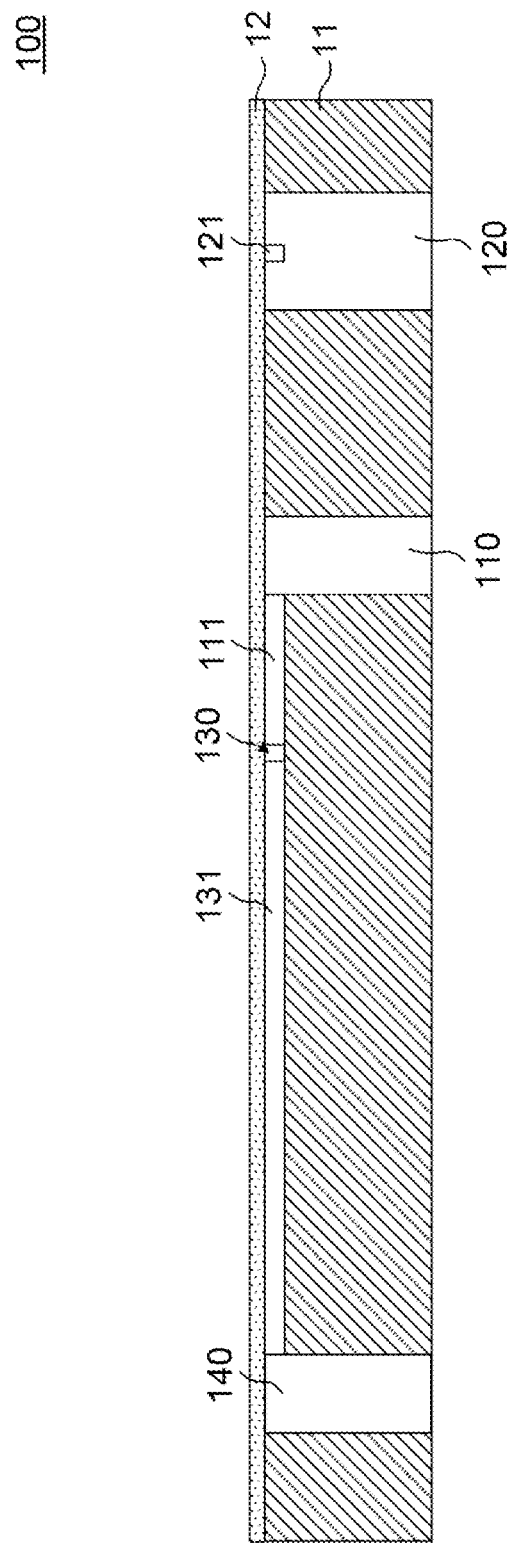
FIG. 2 is a sectional view taken along line A-A indicated in FIG. 1.
Figure 3:
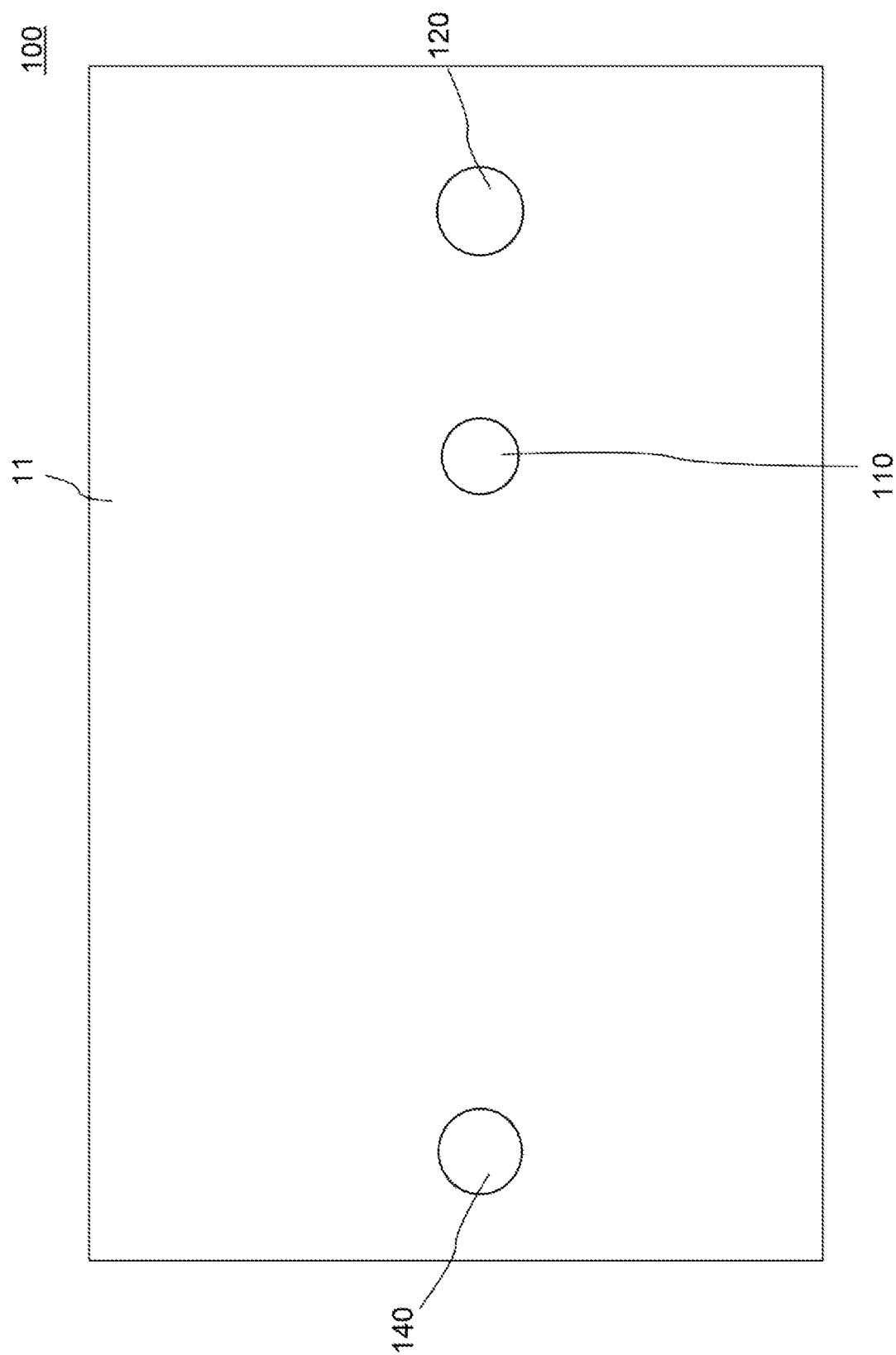
FIG. 3 is a bottom view of the fluid handling device illustrated in FIG. 1.
Figure 4:
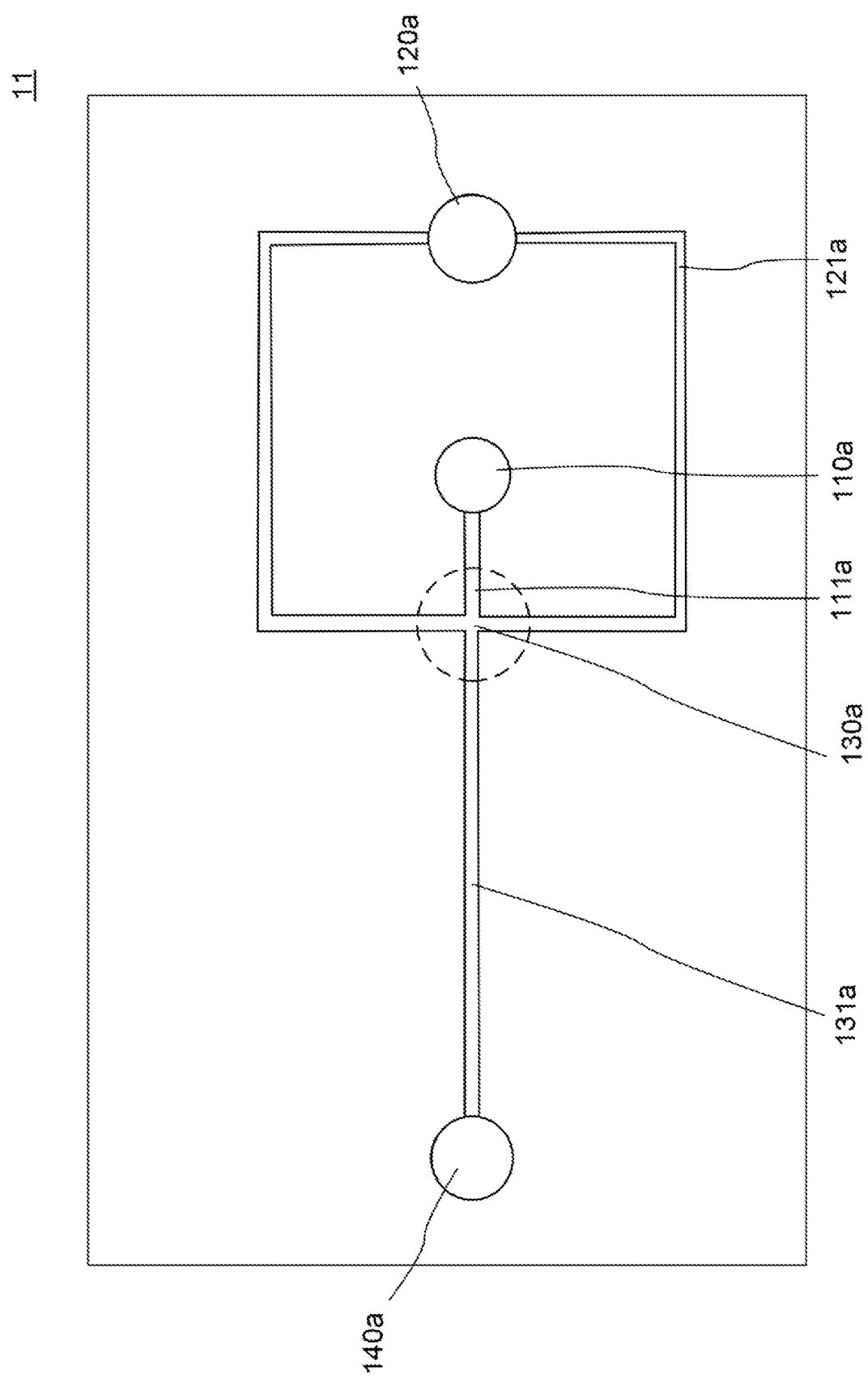
FIG. 4 is a plan view of the substrate of the fluid handling device illustrated in FIG. 1.

FIG. 1 illustrates a plan view of fluid handling device 100 according to an embodiment of the present invention, FIG. 2 illustrates a sectional view taken along line A-A in FIG. 1, and FIG. 3 illustrates a bottom view of fluid handling device 100. As illustrated in FIG. 2, fluid handling device 100 of the present embodiment is composed of substrate 11 and film 12 covering this substrate. FIG. 4 illustrates a plan view of substrate 11 of fluid handling device 100 from which film 12 is removed.

Here, fluid handling device 100 of the present embodiment has a configuration for generating a dispersion liquid in which liquid droplets containing a sample are dispersed in a dispersion medium. However, fluid handling device 100 may have not only the configuration for preparing the dispersion liquid but also a configuration for keeping the dispersion liquid after preparing the dispersion liquid, a configuration for observing or testing the components in the sample, and other configurations.

Further, although the size of each liquid droplet in the dispersion liquid generated by fluid handling device 100 of the present embodiment is not particularly limited, the particle size thereof is preferably 0.1 μm or greater and 1000 μm or less, and more preferably 5 μm or greater and 200 μm or less.

Note that fluid handling device 100 of the present embodiment is extremely useful for a case where the sample is a liquid containing a polar solvent (e.g., an aqueous solution, an aqueous dispersion, or the like) and the dispersion medium is a liquid of an non-polar solvent (e.g., an oil or the like) which is not compatible with the sample. Hereinafter, fluid handling device 100 of the present embodiment will be described in detail.

As illustrated in FIG. 2, fluid handling device 100 of the present embodiment is composed of substrate 11 having grooves, recesses, through holes, and the like, and a flat plate-like film 12 bonded to substrate 11 so as to cover substrate 11.

As illustrated in FIG. 4, sample-introduction-part through hole 110*a*, sample-channel groove 111*a*, dispersion-medium-introduction-part through hole 120*a*, dispersion-medium-channel groove 121*a*, dispersion-liquid-generation-part recess 130*a*, dispersion-liquid-channel groove 131*a*, and dispersion-liquid-collection-part through hole 140*a* are formed in substrate 11.

Sample channel 111 is a region for allowing the sample to flow, and is a channel that is connected, at one end, to sample introduction part 110 and connected, at the other end, to dispersion liquid generation part 130, which will be described later. In the present embodiment, a region surrounded by sample-channel groove 111*a* and film 12 disposed respectively in and on substrate 11 serves as sample channel 111. The width and depth of sample channel 111 (sample-channel groove 111*a*) are not particularly limited as long as the sample introduced from sample introduction part 110 can flow toward dispersion liquid generation part 130.

Further, the cross-sectional shape of sample channel 111 is not particularly limited, and may be any shape such as a semicircular shape, a rectangular shape, or a circular shape.

Note that, the “cross section of the channel” in the present specification means a cross section in a direction orthogonal to the flow direction of the channel.

Sample introduction part 110 is a structure for introducing a sample into fluid handling device 100. In the present embodiment, a region surrounded by sample-introduction-part through hole 110*a* and film 12 disposed respectively in and on substrate 11 serves as sample introduction part 110. In the present embodiment, sample-introduction-part through hole 110*a* is a cylindrical through hole formed in substrate 11, but is not limited to this shape, and may have a structure or the like for connection to a tube, a syringe, or the like, for example. Further, the opening diameter of sample introduction part 110 (sample-introduction-part through hole 110*a*) is not particularly limited as long as the sample can be introduced into the sample introduction part.

Note that, fluid handling device 100 of the present embodiment includes one sample introduction part 110 and linear sample channel 111 connected to sample introduction part 110. However, in fluid handling device 100, sample channel 111 may be branched at its upstream side (the side of sample introduction part 110) into a plurality of channels. In addition, fluid handling device 100 may include a plurality of sample introduction parts 110. For example, when sample channel 111 has a plurality of branched upstream ends connected to different sample introduction parts 110, different components can be introduced into sample channel 111 from respective sample introduction parts 110. Then, it is also possible to mix or react a plurality of components in sample channel 111.

Dispersion medium channel 121 is a region for allowing a dispersion medium to flow, and is a channel connected, at one end, to dispersion medium introduction part 120 and connected, at the other end, to dispersion liquid generation part 130, which will be described later. In the present embodiment, a region surrounded by dispersion-medium-channel groove 121*a* and film 12 disposed respectively in and on substrate 11 serves as dispersion medium channel 121. The width and depth of dispersion medium channel 121 (dispersion-medium-channel groove 121*a*) are not limited as long as the dispersion medium introduced from dispersion medium introduction part 120 can flow toward dispersion liquid generation part 130. In addition, the cross-sectional shape of dispersion medium channel 121 is not particularly limited, and may be any shape such as a semicircular shape, a rectangular shape, or a circular shape.

Dispersion medium introduction part 120 is a structure for introducing a dispersion medium into fluid handling device 100. In the present embodiment, a region surrounded by dispersion-medium-introduction-part through hole 120*a* and film 12 disposed respectively in and on substrate 11 serves as dispersion medium introduction part 120. Note that, in the present embodiment, dispersion-medium-introduction-part through hole 120*a* is a cylindrical through hole formed in substrate 11, but is not limited to this shape. Dispersion medium introduction part 120 (dispersion-medium-introduction-part through hole 120*a*) may have a structure or the like for connection to a tube, a syringe, or the like. Further, the opening diameter of dispersion medium introduction part 120 (dispersion-medium-introduction-part through hole 120*a*) is not particularly limited as long as the dispersion medium can be introduced into the dispersion medium introduction part.

Note that, in fluid handling device 100 of the present embodiment, one dispersion medium introduction part 120 is disposed at the upstream ends of two dispersion medium channels 121. However, fluid handling device 100 may include a plurality of dispersion medium introduction parts 120, and for example, dispersion medium introduction parts 120 may be disposed at the upstream ends of dispersion medium channels 121, respectively.

Figure 5:
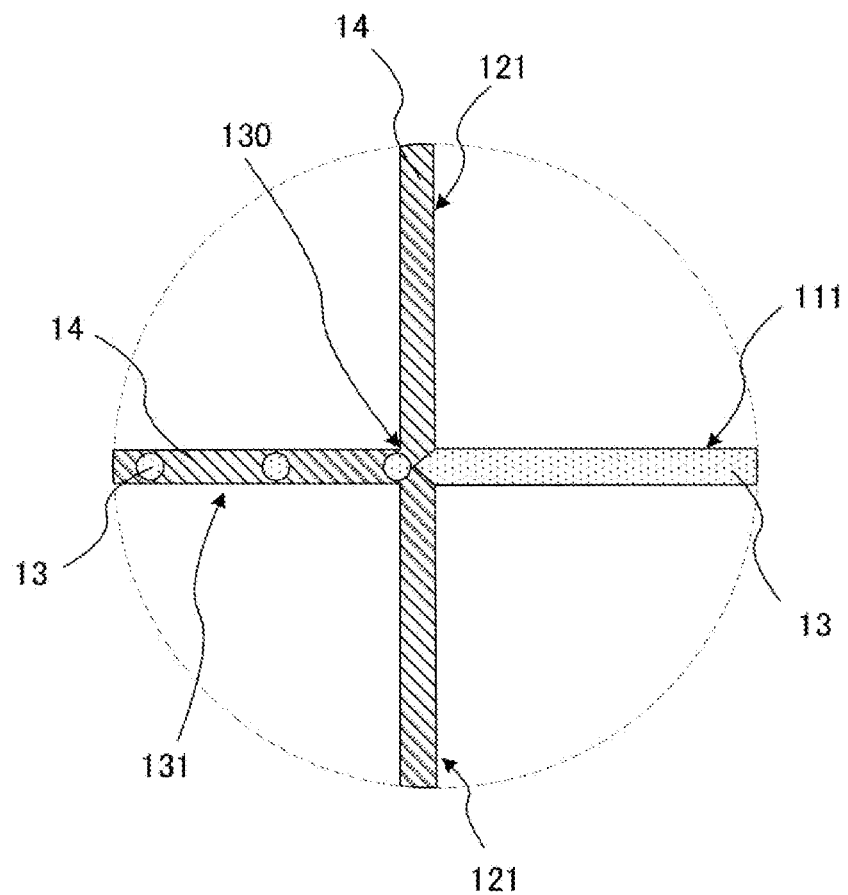
FIG. 5 is a partially enlarged view of a region indicated by a dashed line in FIG. 4, which illustrates a dispersion liquid generation part of the fluid handling device according to an embodiment of the present invention during when a sample and a dispersion medium are caused to flow.

In addition, dispersion liquid generation part 130 is a region connected to sample channel 111 and dispersion medium channels 121 described above, and the downstream side of dispersion liquid generation part 130 is connected to dispersion liquid channel 131. In the present embodiment, a region surrounded by dispersion-liquid-generation-part recess 130a and film 12 disposed respectively in and on substrate 11 serves as dispersion liquid generation part 130. FIG. 5 is a partially enlarged view (partially enlarged view of the region indicated by the broken line in FIG. 4) illustrating the vicinity of dispersion liquid generation part 130 during the time when sample 13 and dispersion medium 14 are caused to flow through fluid handling device 100.

At dispersion liquid generation part 130, sample 13 flowing from sample channel 111 is divided by dispersion medium 14 flowing from dispersion medium channels 121. In the present embodiment, the opening (downstream end) of sample channel 111 and the openings (downstream ends) of two dispersion medium channels 121 are arranged such that the flow of sample 13 flowing from sample channel 111 into dispersion liquid generation part 130 and the flow of dispersion medium 14 flowing from dispersion medium channels 121 into dispersion liquid generation part 130 are substantially orthogonal to each other. Accordingly, a shearing force by dispersion medium 14 is applied to sample 13 from opposite sides, and sample 13 is easily divided into liquid droplets. However, the angle formed by sample 13 and dispersion medium 14 at dispersion liquid generation part 130 is not limited to a substantially right angle, and can be any angle as long as sample 13 can be sufficiently divided by dispersion medium 14.

Note that the size of the opening of sample channel 111 at dispersion liquid generation part 130 is likely to affect the size of each of the liquid droplets. In general, the diameter of the liquid droplet is substantially the same as the diameter of the opening of sample channel 111. It is thus preferable that the size (depth and width) of the opening of sample channel 111 be the same as the desired diameter of the liquid droplet.

In addition, the size of the opening of each of dispersion medium channels 121 at dispersion liquid generation part 130 is also likely to affect the size, the number, the generation yield, and the like of the liquid droplets. Accordingly, the size (depth and width) of the opening of dispersion medium channel 121 is appropriately selected according to the density of desired liquid droplets, the viscosity of the sample, and the like.

In addition, dispersion liquid channel 131 is a channel connected to dispersion liquid generation part 130 and dispersion liquid collection part 140, and configured to allow the dispersion liquid in which the liquid droplets containing the sample are dispersed in the dispersion medium to flow toward dispersion liquid collection part 140. In the present embodiment, a region surrounded by dispersion-liquid-channel groove 131a and film 12 disposed respectively in and on substrate 11 serves as dispersion liquid channel 131.

It is preferable that the size (depth and width) of the cross-section of dispersion liquid channel 131 be larger than the size of the liquid droplets so as not to hinder the movement of the liquid droplets, and be set to, for example, a size (depth and width) equal to or larger than the size of the opening of sample channel 111 located on the side of dispersion liquid generation part 130. The cross-sectional shape of dispersion liquid channel 131 is not particularly limited, and may be any shape such as a semicircular shape, a rectangular shape, or a circular shape.

Further, dispersion liquid collection part 140 is connected to dispersion liquid channel 131 and is an outlet for collecting the dispersion liquid containing the liquid droplets. In the present embodiment, dispersion liquid collection part 140 is formed by dispersion-liquid-collection-part through hole 140a formed in substrate 11 and film 12 that closes one opening of dispersion-liquid-collection-part through hole 140a. The structure of dispersion liquid collection part 140 (dispersion-liquid-collection-part through hole 140a) is not particularly limited as long as the dispersion liquid containing the liquid droplets can be collected from the dispersion liquid collection part. In the present embodiment, dispersion liquid collection part 140 (dispersion-liquid-collection-part through hole 140a) has a cylindrical shape, but may have a structure or the like for connection to a tube, a syringe, or the like. In addition, the opening diameter of dispersion liquid collection part 140 (dispersion-liquid-collection-part through hole 140a) is not particularly limited as long as the dispersion liquid can be collected from the dispersion liquid collection part.

Here, in fluid handling device 100 of the present embodiment, $Y \leq 0.0436X - 1.2563$ is satisfied, where X denotes the contact angle [°] between a portion of the inner wall of above-described dispersion liquid channel 131 and water, and Y denotes the viscosity [mPa·s] of sample 13 flowing through fluid handling device 100 as measured at 25° C. by a falling-ball viscometer (a method based on the Hoppler's falling-ball principle). The contact angle with water is a value measured at 25° C. by a method based on the sessile droplet technique of JIS3257. Further, it is more preferable that contact angle X between at least a portion of the inner wall of dispersion liquid channel 131 and water satisfy $Y \leq 0.0436X - 1.4741$. When contact angle X between a portion of the inner wall of dispersion liquid channel 131 and water and viscosity Y of the sample satisfy the above equation, the liquid droplets generated by dispersion liquid generation part 130 become unlikely to adhere to the inner wall of dispersion liquid channel 131.

Note that, although contact angle X between the entire inner wall of dispersion liquid channel 131 and water and viscosity Y of the sample may satisfy the above equation, contact angle X between only a partial region of the inner wall of dispersion liquid channel 131 (for example, only a portion of the cross section of dispersion liquid channel 131 or only a portion of dispersion liquid channel 131 as seen in plan view) and water and viscosity Y of the sample may satisfy the above equation.

However, it is particularly preferable that, when dispersion liquid channel 131 is seen in plan view, a region satisfying the above equation be formed in the vicinity of dispersion liquid generation part 130. When contact angle X between the inner wall of dispersion liquid channel 131 and water and viscosity Y of the sample satisfy the above equation in a region in the vicinity of dispersion liquid generation part 130, the liquid droplets become unlikely to accumulate in the region.

For example, as in below-described Embodiment 2, when a film made of an acidified polypropylene elastomer (contact angle Xf between film 12 and water is 98°) is used as film 12, when a substrate made of polypropylene (contact angle Xb with water is) 103° is used as substrate 11, and when viscosity Y of the sample is 2.88 mPa·s, the contact angles of all the surfaces surrounding dispersion liquid channel 131 satisfy the above range. Thus, the liquid droplets containing the sample flow without staying in dispersion liquid channel 131.

Here, a method by which contact angle X between at least a portion of the inner wall of dispersion liquid channel 131 and water and viscosity Y of the sample satisfy the above equation is not particularly limited, and for example, contact angle Xf between film 12 and water may be adjusted to satisfy the above equation, or contact angle Xb between substrate 11 and water may be adjusted to satisfy the above equation. In addition, a layer (hereinafter, also referred to as a "water-repellent layer") whose contact angle Xl with water satisfies the above equation may be formed at a desired position (a position corresponding to dispersion liquid channel 131) on substrate 11 or film 12. Further, these techniques may be combined.

Examples of the material forming film 12 that can satisfy the equation, $Y \leq 0.0436 Xf - 1.2563$, and the material forming substrate 11 that can satisfy the equation, $Y \leq 0.0436 Xb - 1.2563$, include cycloolefin copolymers (COC), polypropylenes (PP), fluorinated resins (FEP), polytetrafluoroethylene resins (PTFE), polydimethylsiloxanes (PDMS), elastomers, and the like. The elastomers may be thermoplastic elastomers or thermosetting elastomer resins. Examples of the thermosetting elastomers include polyurethane-based elastomers, polysilicone-based elastomers, and the like. Examples of the thermoplastic elastomers include styrene-based elastomers, olefin-based elastomers, polyester-based elastomers, and the like. Specific examples of the olefinic-based elastomers include polypropylene-based elastomers, and examples of the polypropylene-based elastomers include ZELAS manufactured by Mitsubishi Chemical Co., Ltd. (registered trademark of the company). Examples of the polyester-based elastomers include Pelprene manufactured by Toyobo Co., Ltd. (registered trademark of the company), Hytrel manufactured by Toray DuPont Co., Ltd. (registered trademark of the company), and the like. Film 12 and substrate 11 may contain only one of these materials, or may contain two or more of the materials.

Examples of the material of the water-repellent layer that can satisfy the equation, $Y \leq 0.0436 Xl - 1.2563$, include fluorine, chlorodimethylsilane, silicone (silicon), and the like. The method of forming the water-repellent layer is not particularly limited, and substrate 11 or film 12 may, for example, be coated entirely with a composition containing the material using any of various coating methods such as roll coating, dip coating, and spray coating. Further, the method of forming the water-repellent layer includes a chemical vapor deposition (CVD) method, a vapor deposition method, a solution coating method, and the like. Meanwhile, the composition containing the material may be printed on or applied to only a desired region of film 12 or substrate 11 (e.g., dispersion-liquid-channel groove 131a in substrate 11). Further, after substrate 11 and film 12 are bonded to each other by a known method, the water-repellent layer may be formed on dispersion liquid channel 131 by causing a liquid containing the above material to flow from sample introduction part 110, dispersion medium introduction part 120, or the like toward dispersion liquid collection part 140, and drying or curing the material if necessary.

Note that, contact angle X (Xb, Xf, or Xl) between at least a portion of the inner wall of dispersion liquid channel 131 and water is preferably 95° or greater, and more preferably 95 to 115°. When contact angle X (Xb, Xf, or Xl) is within the above range, it becomes easier to satisfy the above equation even when using a sample having a relatively high viscosity.

Note that, when the water-repellent layer is formed, contact angle Xb between substrate 11 and water and contact angle Xf between film 12 and water do not have to satisfy the above equation. Similarly, when contact angle Xb or Xf between one of substrate 11 and film 12 and water satisfies the above equation, the contact angle between the other one of the substrate and film and water may not satisfy the above equation. Examples of the material forming such a film 12 and the material forming such a substrate 11 include resin materials such as: polyesters such as polyethylene terephthalate; polycarbonate; acrylic resins such as polymethylmethacrylate; polyvinyl chloride; polyolefins such as polyethylene, polypropylene, and cycloolefin resins; polyethers; polystyrene; silicone resins; and elastomers other than the above.

Further, the method of forming substrate 11 and film 12 is not particularly limited, and the substrate and film can be formed by a known molding method. Further, the method of bonding substrate 11 and film 12 to each other is not particularly limited, and the substrate and the film may, for example, be thermally fused and bonded to each other, or may be bonded to each other via an adhesive or the like.

Note that the fluid handling device may be distributed as a dispersion liquid production set, together with a sample that is to be caused to flow through the fluid handling device and contains a polar solvent, and a dispersion medium that is to be caused to flow through the fluid handling device and contains a non-polar solvent.

(Method for Producing Dispersion Liquid)

Next, a method for producing a dispersion liquid (fluid handling method) using fluid handling device 100 according to the present embodiment will be described.

To begin with, a sample is introduced into sample introduction part 110, and a dispersion medium (e.g., oil) is introduced into dispersion medium introduction part 120 substantially at the same time as the sample.

The above sample is, for example, a liquid desired to be sorted as a liquid droplet or a liquid containing a target object desired to be sorted while being enclosed in a liquid droplet. Examples of the sample include liquids containing cells, proteins, nucleic acids, or the like. Further, the sample may further include a solvent (preferably a polar solvent) for dispersion of the target object to be sorted such as cells, proteins, nucleic acids, or the like as described above. In addition, the viscosity of the sample as measured at 25° C. by the falling-ball viscometer (the method based on the floppier's falling-ball principle) is preferably 1.5 to 3.5 mPa·s, and more preferably 1.8 to 2.9 mPa·s.

Further, the dispersion medium is not particularly limited as long as it has low compatibility with the sample and can divide, at dispersion liquid generation part 130, the sample flowing through sample channel 111, but it is preferable that the dispersion medium contain a non-polar solvent.

When introducing the sample into sample introduction part 110, a pressure may be applied to sample introduction part 110. This makes it possible to introduce the sample into sample channel 111 at a constant flow rate. Similarly, when the dispersion medium is introduced into dispersion medium introduction part 120, a pressure may be applied to dispersion medium introduction part 120. This makes it possible to introduce the dispersion medium into dispersion medium channel 121 at a constant flow rate. Note that, instead of applying pressure to sample introduction part 110 and dispersion medium introduction part 120, suction may be performed from the side of dispersion liquid collection part 140.

When sample 13 is introduced into sample channel 111 and dispersion medium 14 is introduced into dispersion medium channels 121, sample 13 is divided by dispersion medium 14 at dispersion liquid generation part 130 as illustrated in FIG. 5. Then, sample 13 is surrounded peripherally by dispersion medium 14, and a dispersion liquid in which liquid droplets of the sample are dispersed in the dispersion medium is generated. Thereafter, the dispersion liquid containing the liquid droplets (sample) flows through dispersion liquid channel 131 and is collected by dispersion liquid collection part 140.

(Effects)

In fluid handling device 100 according to the present embodiment, contact angle X between at least a portion of the inner wall of dispersion liquid channel 131 and water and viscosity Y of sample 13 satisfy a predetermined equation. Accordingly, the liquid droplets of sample 13 are unlikely to adhere to the inner wall of dispersion liquid channel 131. Further, the contact angle of the inner wall of dispersion liquid channel 131 is relatively high, and the inner wall of the dispersion liquid channel has high affinity for dispersion medium 14 containing a non-polar solvent such as oil. Thus, increased likelihood that the inner wall of dispersion liquid channel 131 is covered by dispersion medium 14 also makes it more unlikely for the liquid droplets of sample 13 to adhere to the inner wall of dispersion liquid channel 131. Consequently, the liquid droplets are unlikely to stay in dispersion liquid channel 131, and the liquid droplets smoothly flow toward dispersion liquid collection part 140. In other words, according to fluid handling device 100 of the present embodiment, it is possible to reliably generate a dispersion liquid in which liquid droplets containing a sample are dispersed in a dispersion medium.

EXAMPLES

The present invention will be described in detail based on Examples, but the present invention is not limited to these Examples.

Comparative Example 1

Fluid handling device 100 having the shape illustrated in FIG. 1 was produced. Specifically, substrate 11 having sample-introduction-part through hole 110$a$, sample-channel groove 111$a$, dispersion-medium-introduction-part through hole 120$a$, dispersion-medium-channel groove 121$a$, dispersion-liquid-generation-part recess 130$a$, dispersion-liquid-channel groove 131$a$, and dispersion-liquid-collection-part through hole 140$a$ was prepared using a cycloolefin copolymer (COC). Meanwhile, a film made of a cycloolefin copolymer (COC) was prepared, which was used as film 12. Then, film 12 was disposed to cover the grooves and through holes in substrate 11, and the film 12 and the substrate 11 were thermo-compression bonded to each other. In this fluid handling device 100, dispersion liquid channel 131 was surrounded by substrate 11 and film 12 made of the cycloolefin copolymer (COC), and the contact angle with water was 86° in all regions of dispersion liquid channel 131. Note that, the contact angle between substrate 11 and water and the contact angle between film 12 and water were measured in accordance with the sessile droplet technique of JIS3257.

Then, a sample (an aqueous solution containing beads and a surfactant at 25° C. with a viscosity of 2.88 mPa·s as measured by a falling-ball viscometer) was introduced into fluid handling device 100 from sample introduction part 110. Further, a dispersion medium (fluorine-based inert liquid) was introduced from dispersion medium introduction part 120 of the fluid handling device.

Then, evaluation was made, based on the following criteria, as to whether or not the sample was successfully divided at dispersion liquid generation part 130, and a dispersion liquid was successfully generated without the sample staying in dispersion liquid channel 131:

Excellent: The dispersion liquid (liquid droplets containing the sample) was successfully generated without the sample staying; and Poor: The liquid droplets containing the sample adhered to the inside of dispersion liquid channel 131, and the sample became a laminar flow.

The results are given in Table 1.

Example 1

As in Comparative Example 1, substrate 11 and film 12 made of a cycloolefin copolymer (COC) were prepared, and were thermo-compression bonded to each other. Then, Fluorosurf (manufactured by Fluoro Technology Co., Ltd.) was introduced from sample introduction part 110 and dispersion medium introduction part 120, and was collected from dispersion liquid collection part 140. Air was introduced into sample introduction part 110 and dispersion medium introduction part 120 one minute after Fluorosurf was caused to flow, and excess Fluorosurf having adhered to sample channel 111, dispersion medium channel 121, dispersion liquid generation part 130, and dispersion liquid channel 131 was removed. Thereafter, the bonded substrate and film was allowed to stand for 24 hours for drying the inside, and thus, fluid handling device 100 was obtained. In this fluid handling device 100, the contact angle between dispersion liquid channel 131 and water were 104° everywhere. The contact angle with water was measured in the same manner as in Comparative Example 1.

Thereafter, as in Comparative Example 1, a sample and a dispersion medium were introduced, and evaluation was made as to whether a dispersion liquid was successfully generated by fluid handling device 100. The results are given in Table 1.

Example 2

Fluid handling device 100 was prepared in the same manner as in Comparative Example 1, except that the material of substrate 11 was polypropylene (PP) and the material of film 12 was ZELAS (manufactured by Mitsubishi Chemical Co., Ltd.; ZELAS is a registered trademark of the company). In this fluid handling device 100, the contact angle between film 12 and water within dispersion liquid channel 131 was 98°, and the contact angle between substrate 11 (dispersion-liquid-channel groove 131$a$) and water was 103°. The contact angles with water were measured in the same manner as in Comparative Example 1.

Thereafter, as in Comparative Example 1, a sample and a dispersion medium were introduced, and evaluation was made as to whether a dispersion liquid was successfully generated by fluid handling device 100. The results are given in Table 1.

[Results]

TABLE 1

| | Substrate Material | Film Material | Hydrophobic Coating | Contact Angle X within Dispersion Liquid Channel [°] | 0.0436X − 1.2563 | Dispersion Generation Evaluation |
|---|---|---|---|---|---|---|
| Comparative Example 1 | COC | COC | Not applied | 86 | 2.50 | Poor |
| Example 1 | COC | COC | Applied | 104 | 3.29 | Excellent |
| Example 2 | PP | Zelas (registered trademark) | Not applied | 98 (film side)/103 (substrate side) | 3.02 (film side)/ 3.23 (substrate side) | Excellent |

As shown in Table 1 above, when contact angle X with water within dispersion liquid channel 131 and viscosity Y (2.88 mPa·s) of the sample as measured at 25° C. by the falling-ball viscometer satisfy Y≤0.0436X−1.2563, the dispersion liquid was successfully generated stably (Examples 1 and 2). On the other hand, when the equation was not satisfied, the sample became a laminar flow during generation of the dispersion liquid, and the liquid droplets could not be sufficiently generated (Comparative Example 1).

INDUSTRIAL APPLICABILITY

The fluid handling device and the like of the present invention are applicable to, for example, clinical tests, food tests, environmental tests, and the like.

REFERENCE SIGNS LIST

11 Substrate
12 Film
13 Sample
14 Dispersion medium
100 Fluid handling device
110 Sample introduction part
110a Sample-introduction-part through hole
111 Sample channel
111a Sample-channel groove
120 Dispersion medium introduction part
120a Dispersion-medium-introduction-part through hole
121 Dispersion medium channel
121a Dispersion-medium-channel groove
130 Dispersion liquid generation part
130a Dispersion-liquid-generation-part recess
131 Dispersion liquid channel
131a Dispersion-liquid-channel groove
140 Dispersion liquid collection part
140a Dispersion-liquid-collection-part through hole

What is claimed is:

1. A fluid handling device, comprising:
a substrate including a sample-channel groove, a dispersion-medium-channel groove, a dispersion-liquid-generation-part recess, and a dispersion-liquid-channel groove;
a film that covers the substrate;
a sample channel for allowing a sample to flow therethrough, the sample channel being a region surrounded by the sample-channel groove and the film;
a dispersion medium channel for allowing a dispersion medium to flow therethrough, the dispersion medium channel being a region surrounded by the dispersion-medium-channel groove and the film;
a dispersion liquid generation part connected to the sample channel and the dispersion medium channel, and configured to divide the sample by the dispersion medium to generate a dispersion liquid in which a liquid droplet of the sample is dispersed in the dispersion medium, the dispersion liquid generation part being a region surrounded by the dispersion-liquid-generation-part recess and the film; and
a dispersion liquid channel connected to the dispersion liquid generation part, and configured to allow the dispersion liquid to flow therethrough, the dispersion liquid channel being a region surrounded by the dispersion-liquid-channel groove and the film, wherein
Y≤0.0436X−1.2563 is satisfied, where X denotes a contact angle [°] between a portion of an inner wall of the dispersion liquid channel and water, and Y denotes a viscosity [mPa·s] of the sample measured at 25° C. by a falling-ball viscometer.

2. The fluid handling device according to claim 1, wherein Y≤0.0436Xf−1.2563 is satisfied, where Xf denotes a contact angle [°] between the film and water.

3. The fluid handling device according to claim 1, wherein Y≤0.0436Xb−1.2563 is satisfied, where Xb denotes a contact angle [°] between the substrate and water.

4. The fluid handling device according to claim 1, further comprising:
a water-repellent layer on a portion of the dispersion-liquid-channel groove, wherein
Y≤0.0436Xl−1.2563 is satisfied, where Xl denotes a contact angle [°] between the water-repellent layer and water.

5. A dispersion liquid production set, comprising:
the fluid handling device according to claim 1;
a sample that is to be caused to flow through the fluid handling device, and contains a polar solvent; and
a dispersion medium that is to be caused to flow through the fluid handling device, and contains a non-polar solvent.

6. A method for producing a dispersion liquid, comprising:
causing, to flow through the sample channel of the fluid handling device according to claim 1, a sample containing a polar solvent and having a viscosity of 1.5 to 3.5 mPa·s measured at 25° C. by a falling-ball viscometer; and
causing a dispersion medium containing a non-polar solvent to flow through the dispersion medium channel of the fluid handling device substantially at the same time as causing the sample to flow.

* * * * *